(12) United States Patent
Horvath

(10) Patent No.: US 6,324,191 B1
(45) Date of Patent: Nov. 27, 2001

(54) OSCILLATOR WITH MODE CONTROL

(75) Inventor: Christopher Horvath, Irvine, CA (US)

(73) Assignee: IntraLase Corp., Irvine, CA (US)

( * ) Notice: Subject to any disclaimer, the term of this patent is extended or adjusted under 35 U.S.C. 154(b) by 0 days.

(21) Appl. No.: 09/481,172

(22) Filed: Jan. 12, 2000

(51) Int. Cl.[7] ............... H01S 3/098; H01S 3/10; H01S 3/13
(52) U.S. Cl. ............... 372/19; 372/20; 372/29; 372/30; 372/31
(58) Field of Search .................. 372/19, 20, 14, 372/25, 30, 31, 32, 29; 356/121, 138; 331/37, 38; 333/187

(56) References Cited

U.S. PATENT DOCUMENTS

| | | |
|---|---|---|
| 3,769,963 | 11/1973 | Goldman et al. . |
| 3,821,510 | 6/1974 | Muncheryan . |
| 3,828,788 | 8/1974 | Krasnov et al. . |
| 3,843,865 | 10/1974 | Nath . |
| 3,869,680 | 3/1975 | Fletcher et al. . |
| 4,025,875 | 5/1977 | Fletcher et al. . |
| 4,044,316 | 8/1977 | Kennedy . |
| 4,069,823 | 1/1978 | Isakov et al. . |
| 4,091,274 | 5/1978 | Angelbeck et al. . |
| 4,091,814 | 5/1978 | Togo . |
| 4,103,254 | 7/1978 | Chikami . |
| 4,207,874 | 6/1980 | Choy . |
| 4,210,400 | 7/1980 | Misek . |
| 4,309,998 | 1/1982 | Aron nee Rosa et al. . |
| 4,391,275 | 7/1983 | Fankhauser et al. . |
| 4,452,517 | 6/1984 | Kohayakawa et al. . |
| 4,469,098 | 9/1984 | Davi . |
| 4,485,473 | 11/1984 | Tang et al. . |
| 4,503,854 | 3/1985 | Jako . |
| 4,517,980 | 5/1985 | Tagnon . |
| 4,538,608 | 9/1985 | L'Esperance, Jr. . |
| 4,559,942 | 12/1985 | Eisenberg . |
| 4,561,436 | 12/1985 | Munnerlyn . |
| 4,579,430 | 4/1986 | Bille . |
| 4,580,559 | 4/1986 | L'Esperance . |
| 4,598,311 | 7/1986 | Bellina . |
| 4,601,288 | 7/1986 | Myers . |
| 4,622,967 | 11/1986 | Schachar . |
| 4,638,800 | 1/1987 | Michel . |
| 4,665,524 | 5/1987 | Cotter . |
| 4,665,913 | 5/1987 | L'Esperance, Jr. . |
| 4,669,466 | 6/1987 | L'Esperance . |
| 4,704,583 | 11/1987 | Gould . |
| 4,711,542 | 12/1987 | Ichihashi et al. . |
| 4,718,418 | 1/1988 | L'Esperance, Jr. . |

(List continued on next page.)

OTHER PUBLICATIONS

Marshall, John et al., *Photoablative Reprofiling of the Cornea Using an Excimer Laser: Photorefractive Keratectomy*, pp. 21–48, Lasers in Ophthalmology vol. 1, No. 1.

Correspondence, pp. 130–131, American Journal of Ophthalmology, Jan. 1986.

*Primary Examiner*—Frank G. Font
*Assistant Examiner*—Armando Rodriguez
(74) *Attorney, Agent, or Firm*—Fulbright & Jaworski L.L.P.

(57) ABSTRACT

An oscillator for isolating a transverse electromagnetic (TEM) zero—zero mode pulsed laser beam includes a laser pumping diode that is mounted on a base to induce a multi-mode laser beam from a lasing medium. As initially induced, the multi-mode laser beam is directed along a path and is characterized by a beating signal which has a frequency that is based on amplitude variations of laser pulses in the multi-mode laser beam. Electronics detect this beating signal and generates a responsive error signal. With closed loop control, the error signal is used to advance a straightedge toward the path of the multi-mode laser beam to remove transverse modes from the multi-mode laser beam with the straightedge. This advancement continues until the error signal is a null and the zero—zero mode pulsed laser beam is thereby isolated.

19 Claims, 1 Drawing Sheet

U.S. PATENT DOCUMENTS

| | | |
|---|---|---|
| 4,727,381 | 2/1988 | Bille et al. . |
| 4,729,372 | 3/1988 | L'Esperance, Jr. . |
| 4,732,148 | 3/1988 | L'Esperance, Jr. . |
| 4,734,557 | 3/1988 | Alfille et al. . |
| 4,770,172 | 9/1988 | L'Esperance, Jr. . |
| 4,773,414 | 9/1988 | L'Esperance, Jr. . |
| 4,781,453 | 11/1988 | Kobayashi . |
| 4,784,135 | 11/1988 | Blum et al. . |
| 4,798,204 | 1/1989 | L'Esperance, Jr. . |
| 4,881,808 | 11/1989 | Bille et al. . |
| 4,887,592 | 12/1989 | Loertscher . |
| 4,907,586 | 3/1990 | Bille et al. . |
| 4,988,348 | 1/1991 | Bille . |
| B1 4,053,845 | 4/1987 | Gould . |
| B1 4,161,436 | 4/1988 | Gould . |

OSCILLATOR WITH MODE CONTROL

FIELD OF THE INVENTION

The present invention pertains generally to oscillators which are useful for generating pulsed laser beams. More particularly, the present invention pertains to devices and methods which are useful for isolating a transverse electro-magnetic (TEM) zero—zero mode pulsed laser beam from a multi-mode pulsed laser beam. The present invention is particularly, but not exclusively, useful for generating a zero—zero mode pulsed laser beam which is useful for ophthalmic surgery.

BACKGROUND OF THE INVENTION

It is known that oscillators can be incorporated into laser systems to generate laser beams which comprise a train of laser pulses. More specifically, it is known that pulsed laser beams are useful for ophthalmic laser surgery. For example, U.S. Pat. No. 4,764,930 which issued to Bille et al. for an invention entitled "Multiwavelength Laser Source" and which is assigned to the same assignee as the present invention, discloses a system for use in ophthalmic laser surgery which generates a beam of laser pulses wherein the pulses are of extremely short duration and are generated at an extremely high frequency.

The object in creating a pulsed laser beam which can be effectively used for ophthalmic laser surgery is to quickly and efficiently create a beam of highly concentrated laser light pulses. Importantly, the individual laser light pulses in such a beam should be uniform in intensity (pulse to pulse). Stated differently, it is desirable to have a so-called zero—zero mode pulsed laser beam which does not have the detracting characteristics caused by multiple transverse modes wherein the amplitudes of the pulses vary over time.

In longitudinal diodepumped lasers it is very difficult to focus into a small lasermode because of the relative bad beam quality of the laserdiode.

In high power single strip laserdiodes it is particularly the axis parallel to the strip which has a bad beam quality and therefore makes modematching with a small lasermode in that axis very difficult. Bad modematching (in this case a too big pumpbeam compared to the lasermode in the gain medium in one axis) will result in the creation of higher modes in addition to the transverse electromagnetic (TEM) zero—zero mode ($TEM_{00}$-Mode) in that axis. Thus, heretofore it has been necessary to choose between a quick and easy self-starting generation of a pulsed laser beam with a small gainvolume, and accepting the consequences of the resultant multi-mode condition, or getting a single $TEM_{00}$ Mode by increasing the gainvolume but accepting the slower and less reliable self starting condition of the laser pulses.

Multi-mode pulsed laser beams have certain specific characteristics which are relatively easily identifiable. For one, there is a central pulse mode (the zero—zero mode). Additionally, there are linked transverse modes which can exist in addition to the central pulse mode. More specifically, the higher modes are diametrically symmetric to the central pulse and, when there is more than one, all have the tendency to align linearly with the bad pumpdiode axis.

Another characteristic of all multi-mode pulsed laser beams is that due to small frequency differences in the laser light between the transverse modes, the interferometrical addition of these modes result in a beating signal which has a frequency that is about five or six times slower than the frequency of pulses in the laser beam. Further, due to the symmetry of the transverse modes in the multi-mode beam, if one side of the mode is removed from the beam on one side of the central pulse, the other side is also removed from the other side of the central pulse.

In light of the above it is an object of the present invention to provide an oscillator for isolating a transverse electro-magnetic (TEM) zero—zero mode pulsed laser beam which can benefit from the relatively quick response time for initial generation of a multi-mode pulsed laser beam. It is also an object of the present invention to provide an oscillator for isolating a transverse electro-magnetic (TEM) zero—zero mode pulsed laser beam which can quickly convert an induced multi-mode laser beam into a zero—zero mode laser beam. Still another object of the present invention is to provide an oscillator for isolating a transverse electromagnetic (TEM) zero—zero mode pulsed laser beam which uses closed loop control to maintain a zero—zero mode pulsed laser beam. It is yet another object of the present invention to provide an oscillator for isolating a transverse electro-magnetic (TEM) zero—zero mode pulsed laser beam which is simple to operate, relatively easy to manufacture and comparatively cost effective.

SUMMARY OF THE PREFERRED EMBODIMENTS

An oscillator for isolating a transverse electromagnetic (TEM) zero—zero mode pulsed laser beam in accordance with the present invention includes a lasing medium which is mounted on a base, and a laser pumping diode which is also mounted on the base. Preferably the lasing medium is Nd:glass (1%–3%) and the laser pumping diode is a ≦200 µm stripe diode which is capable of generating light having a wavelength of approximately eight hundred and eight nanometers (808 nm). With this combination, the result is an induced beam of laser light which has a wavelength of approximately one thousand and sixty nanometers (1060 nm). Within the oscillator, the induced beam of laser light is reflected back and forth on a path that is established by a plurality of coated mirrors. As the laser light reflects back and forth in the oscillator-cavity, pulses of multi-mode laser light are created in a manner well known in the art.

An optical detector is provided to sense the pulses of multi-mode laser light that are induced in the oscillator. Additionally, the optical detector is used to generate a signal that is characteristic of these pulses. Specifically, the detector works in combination with electronics to isolate a beating signal that is indicative of pulse amplitude variations in the multi-mode laser light beam. As mentioned above, it is typical that the frequency of this beating signal will be approximately five to six times slower than the frequency of laser pulses in the beam. Thus, the beating signal can be relatively easily identified, when present (i.e. when there is a multi-mode laser beam), and the variations in pulse amplitude and can, therefore, be converted into an error signal.

The oscillator of the present invention also includes an interrupter that is mounted on the base. Specifically, this interrupter is formed with a straightedge, and it is mounted on the base for advancement toward the path of the multi-mode laser beam in response to the error signal that is generated by the electronics. As intended for the present invention, as the straightedge is advanced toward the path of the multi-mode laser beam, it will shave or remove the transverse modes from the laser beam. This action is then continued until all of the transverse modes have been removed. When this is accomplished the error signal will be substantially a null and the zero—zero mode of the laser beam will have been isolated.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
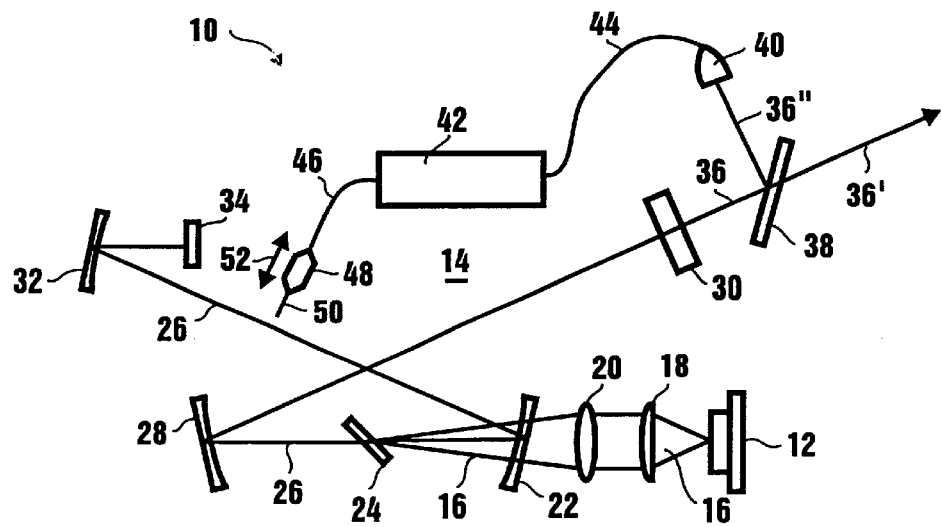
FIG. 1 is a schematic diagram of the oscillator of the present invention.

Referring initially to FIG. 1, an oscillator in accordance with the present invention is shown in a schematic diagram and is generally designated with the number 10. As shown, the oscillator 10 includes a laser pumping diode 12 which is mounted on a base 14. Preferably, the laser pumping diode 12 is a 100 $\mu$m stripe diode which will generate a laser beam 16 having a wavelength of approximately eight hundred and eight nanometers (808 nm). As light beam 16 leaves the laser pumping diode 12, lens 18 and lens 20 focus the light beam 16 through a dichroic beam splitter 22 and onto a lasing medium 24. For the oscillator 10 of the present invention, it is preferable that the beam splitter 22 pass more than approximately ninety five percent of the 808 nm wavelength light in beam 16.

In a manner well known by the skilled artisan, the light in beam 16 from laser pumping diode 12 will induce a laser beam 26 at the lasing medium 24. For the present invention, which preferably uses a lasing medium 24 that is composed of Nd:Silicate (or Nd:Phosphate), the induced laser beam 26 will have a wavelength of approximately 1060 nm. Once induced, the laser beam 26 will travel from the lasing medium 24 toward a turning mirror 28 where it will then be reflected toward an output coupler 30. For the purposes of disclosure, when referring to FIG. 1, it is to be appreciated that the laser beam 26, and the path on which it travels in the oscillator 10, are both designated with the number 26.

For the present invention, the output coupler 30 of the oscillator 10 is of a type which will reflect approximately >95% of the light in laser beam 26 that is incident on the output coupler 30. The remaining <5% of the light in laser beam 26, i.e. that portion of the beam 26 which is not reflected from the output coupler 30, is thus allowed to leave the oscillator 10. On the other hand, the >95% of the light in laser beam 26 that is reflected from output coupler 30 is directed back toward the turning mirror 28 where it is reflected toward the dichroic beam splitter 22.

Recall, it is an important aspect of the present invention that the dichroic beam splitter 22 allow 808 nm wavelength light from the laser pumping diode 12 to pass through the beam splitter 22. It is just as important, however, that the beam splitter 22 not allow passage of 1060 nm wavelength light (i.e. laser beam 26) through the beam splitter 22. Thus, the laser beam 26 is reflected at the beam splitter 22 toward the turning mirror 32 where, in turn, it is reflected toward the mirror 34. For the present invention, the mirror 34 is constructed with a multi layer semiconductor structure of a type which is commonly known by those skilled in the art as an Antiresonant Fabry Perot Saturable Absorber (AFPSA) or Semiconductor Saturable Absorber Mirror (SESAM). From the mirror 34, the laser beam 26 is then reflected back along its path 26 to the output coupler 30. On its return path, the laser beam 26 is reflected, in order, by turning mirror 32, beam splitter 22 and turning mirror 28. At the output coupler 30, more than 95% of the light in beam 26 is again reflected for a round trip between the output coupler 30 and the mirror (AFPSA) 34. This continues in a manner well known in the art, until a pulsed laser beam 36 which is useful for ophthalmic surgery has been generated. As disclosed herein, the optical elements between mirror 34 and the output coupler 30 define what is more commonly referred to as the cavity of the oscillator 10.

Dispersion control for the light in beam 26 inside the cavity of the oscillator 10 is required in order to create and maintain a pulsed laser beam 26. For the oscillator 10 of the present invention, this is provided by a chirped coating which is appropriately layered onto the reflective surfaces of the reflecting elements: beam splitter 22, turning mirror 28, output coupler 30, turning mirror 32 and mirror 34. It happens for the oscillator 10 that this dispersion control is actually a negative dispersion control in that it is the speed of the shorter wavelengths (e.g. blue) that is increased relative to that of the longer wavelengths (e.g. red).

As the pulsed laser beam 36 (i.e. 1% of the laser beam 26) is emitted from the cavity of oscillator 10 by the output coupler 30 it is directed toward a beam splitter 38 which allows about ninety percent (90%) of the beam 36 to pass through as a useable beam 36'. According to the present invention, the beam 36' (i.e. 90% of beam 36) is intended primarily for use in ophthalmic surgical procedures. The remaining ten percent (10%) of beam 36 is reflected from the beam splitter 38 toward a light detector 40 as a sample beam 36".

As shown in FIG. 1, the light detector 40 is connected to electronics 42 (which may include a comparator/computer) via a line 44, and the electronics 42 are connected via a line 46 with an interrupter 48. As shown, the interrupter 48 includes a straightedge 50. As intended for the oscillator 10 of the present invention, the interrupter 48 is mounted on the base 14 for reciprocal motion back and forth in the direction of the arrows 52. Specifically, the interrupter 48 is moveable in directions substantially perpendicular to the laser beam path 26 so that the straightedge 50 can be advanced to actually block portions of the beam 26 from further travel through the oscillator 10.

Operation

In the operation of the oscillator 10 of the present invention, the laser pumping diode 12 is activated to generate the pumping beam 16. The lasing medium 24 is then affected by the beam 16 to induce the laser beam 26. As the beam 26 is generated and is reflected back and forth along its path 26 in the oscillator 10, portions of the beam 26 eventually exit the oscillator 10 through the output coupler 30 as a pulsed laser beam 36. Initially, in order to expedite the generation of laser beam 26, the laser beam 26 is allowed to develop in the oscillator 10 as a multi-mode pulsed laser beam 26. This same beam 26 will then, of course, exit the oscillator 10 as a multi-mode pulsed laser beam 36 (the distinction here is that beam 26 is inside oscillator 10 and beam 36 is outside oscillator 10). Such a multi-mode pulsed laser beam 26/36 is depicted in FIG. 2A and FIG. 3A.

Figure 2A:
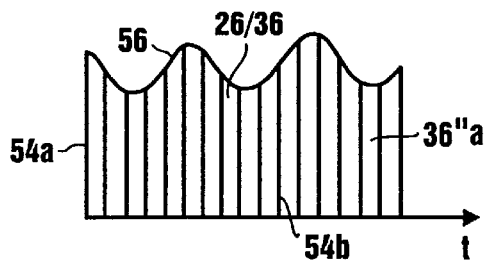
FIG. 2A is a representative pulse train of a multi-mode pulsed laser beam with a superposed beating signal.

In FIG. 2A it can be appreciated that the laser beam 26/36 is actually a sequential train of individual light pulses 54, of which the pulses 54a and 54b are exemplary. Also, it can be seen that when the laser beam 26/36 is in a multi-mode configuration (FIG. 2A and FIG. 3A) the amplitudes of the pulses 54 will be different. In FIG. 2A this amplitude variation is depicted by the sine wave 56. Importantly, the sine wave 56 is detectable as what will be referred to hereinafter as a "beating signal."

Figure 3A:
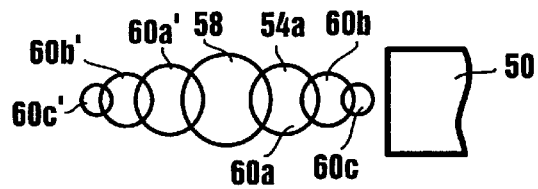
FIG. 3A is a representation of a multi-mode pulsed laser beam before removal of transverse modes by an interrupter.

In another aspect of the multi-mode configuration for the laser beam 26/36, FIG. 3A shows that each pulse 54 (e.g. pulse 54a) is characterized by a central pulse (zero—zero mode) 58. Additionally, when in this multi-mode configuration, the pulse 54a will include linked transverse modes 60. For purposes of illustration, in FIG. 3A the transverse mode 60a is shown linked with the transverse mode 60a', transverse mode 60b is linked with transverse mode 60b' and transverse mode 60c is linked with transverse mode 60c'.

Figure 2B:
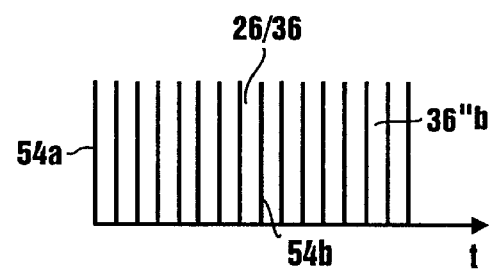
FIG. 2B is a representative pulse train of a zero—zero mode pulsed laser beam.

As indicated above, when the laser beam 26/36 is in a multi-mode configuration, the amplitudes of pulses 54 in the beam 26/36 will vary (e.g. the amplitude of pulse 54a will be different from the amplitude of pulse 54b). However, it is known that as the number of transverse modes 60 in each of the individual pulses 54 is decreased, the difference in the respective amplitudes of the pulses 54 is also decreased. Importantly, as indicated above, the variations in pulse amplitude are detectable as a beating signal 56. Thus, it happens that the amplitude of the beating signal 56 is indicative of the number of transverse modes 60 which are present in the pulses 54 of the laser beam 26/36. This fact can then be used to generate an error signal in electronics 42 which are, in effect, proportional to the number and intensity (strength) of transverse modes that are present in the pulses 54 of the laser beam 26/36. When there are no transverse modes 60 present (i.e. there is a zero—zero mode laser beam 26) the amplitudes of all pulses 54 in the laser beam 26 will be uniform (see FIG. 2B).

Figure 3C:
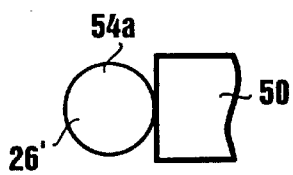
FIG. 3C is a representation of an isolated zero—zero mode pulsed laser beam after the transverse modes have been removed.
Figure 3B:
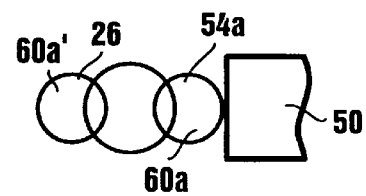
FIG. 3B is a representation of a multi-mode pulsed laser beam as transverse modes are being shaved or removed by an interrupter.

In accordance with the operation of oscillator 10 of the present invention, whenever a beating signal 56 is detected by light detector 40, an error signal is generated by the electronics 42. The error signal will then cause the interrupter 48 to advance toward the laser beam path 26 in the direction of arrow 52. As the interrupter 48 advances in this manner, the straightedge 50 begins to block the laser beam 26. By comparing FIG. 3A with FIG. 3B, it will be seen that an advancement of the straightedge 50 has caused the transverse laser modes 60c and 60b to be removed from the beam 26. Because of their linkage symmetry, the parts on the other side of the TEM$_{00}$-Mode have also been removed. Due to the fact the number of transverse laser modes has been reduced, the amplitude of the beating signal 56 is reduced. Consequently, the resultant error signal has also been reduced but, at this point, not completely eliminated. Therefore, because there is still an error signal, the interrupter 48 and straightedge 50 will continue to advance. Specifically, as seen by comparing FIG. 3B with FIG. 3C, the straightedge 50 will be advanced until the transverse mode 60a and its linked transverse mode 60a' are removed from the laser beam 26/36. At this point, the pulse 54a of beam 26 has been isolated as a zero—zero mode laser beam 26' and, due to the absence of transverse modes 60, there is no beating signal. Accordingly, there is no error signal (i.e. it is a null) and the straightedge 50 is advanced no farther. The result is an isolated TEM zero—zero mode laser beam 26/36 wherein all of the pulses 54 have a uniform amplitude (see FIG. 2B).

As will be appreciated by the skilled artisan, as transverse modes 60 appear with the laser beam 26/36, the presence of a beating signal 56 will cause an error signal at the electronics 42. This error signal will then be used to advance the straightedge 50 in a manner as disclosed above until the error signal is a null and is, therefore, indicative of the fact there are no transverse modes on the laser beam 26/36. If the pulse generation in the laser stops for any reason, the blade will move back to its initial position which allows the oscillator to start in multimode again and then the whole process starts over. In this manner, the oscillator 10 of the present invention is provided with closed loop control for continuing the isolation of a zero—zero mode laser beam 26/36.

While the particular Oscillator with Mode Control as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An oscillator for isolating a transverse electro-magnetic (TEM) zero—zero mode pulsed laser beam which comprises:
   a base;
   a lasing medium mounted on said base;
   a laser pumping diode mounted on said base for inducing a multi-mode laser beam from said lasing medium, said multi-mode laser beam being characterized by at least one laser pulse and a beating signal indicative of a multi-mode condition in said laser beam, said multi-mode laser beam being directed along a path;
   electronics means for detecting said beating signal of said multi-mode laser beam and for generating an error signal in response thereto; and
   an interrupter formed with a straightedge, said interrupter being mounted on said base for advancement toward said path in response to said error signal to remove transverse modes from said multi-mode laser beam with said straightedge until said error signal is substantially a null and said zero—zero mode pulsed laser beam is thereby isolated.

2. An oscillator as recited in claim 1 wherein each pulse in said multi-mode laser beam has an amplitude and said beating signal has a frequency based on variations in said amplitudes.

3. An oscillator as recited in claim 2 wherein said frequency of said beating signal is approximately twenty megahertz (20 MHz).

4. An oscillator as recited in claim 1 wherein said laser pumping diode is a 100 μm stripe diode generating light with a wavelength of approximately eight hundred and eight nanometers (808 nm).

5. An oscillator as recited in claim 1 wherein said lasing medium is Nd:Silicate (3%).

6. An oscillator as recited in claim 1 further comprising:
   a plurality of mirrors, said mirrors having reflective surfaces for establishing said path for said multi-mode laser beam; and a chirped coating layered onto said reflective surfaces of respective said mirrors for providing dispersion control for said multi-mode laser beam.

7. An oscillator as recited in claim 1 wherein said isolated zero—zero mode pulsed laser beam has a wavelength of approximately one thousand and sixty nanometers (1060 nm).

8. An oscillator for isolating a transverse electromagnetic (TEM) zero—zero mode pulsed laser beam which comprises:
   a means for inducing a multi-mode laser beam from a lasing medium, said multi-mode laser beam being characterized by at least one laser pulse and a beating signal indicative of a multi-mode condition in said laser beam, said multi-mode laser beam being directed along a path;
   a means for detecting said beating signal of said multi-mode laser beam and for generating an error signal in response thereto; and
   a means for advancing a straightedge toward said path in response to said error signal to remove transverse modes from said multi-mode laser beam with said straightedge until said error signal is substantially a null and said zero—zero mode pulsed laser beam is thereby isolated.

9. An oscillator as recited in claim 8 wherein said inducing means is a laser pumping diode generating light with a wavelength of approximately eight hundred and eight nanometers (808 nm).

10. An oscillator as recited in claim 8 wherein each pulse in said multi-mode laser beam has an amplitude and said beating signal has a frequency based on variations in said amplitudes.

11. An oscillator as recited in claim 10 wherein said frequency of said beating signal is approximately twenty megahertz (20 MHz) and wherein said lasing medium is Nd:Silicate (3%).

12. An oscillator as recited in claim 8 further comprising:
   a plurality of mirrors, said mirrors having reflective surfaces for establishing said path for said multi-mode laser beam; and
   a chirped coating layered onto said reflective surfaces of respective said mirrors for providing dispersion control for said multi-mode laser beam.

13. An oscillator as recited in claim 8 wherein said isolated zero—zero mode pulsed laser beam has a wavelength of approximately one thousand and sixty nanometers (1060 nm).

14. A method for isolating a transverse electromagnetic (TEM) zero—zero mode pulsed laser beam which comprises the steps of:
   inducing a multi-mode laser beam from a lasing medium, said multi-mode laser beam being characterized by at least one laser pulse and a beating signal indicative of a multi-mode condition in said laser beam, said multi-mode laser beam being directed along a path;
   detecting said beating signal of said multi-mode laser beam;
   generating an error signal in response to said beating signal; and
   advancing a straightedge toward said path in response to said error signal to remove transverse modes from said multi-mode laser beam with said straightedge until said error signal is substantially a null and said zero—zero mode pulsed laser beam is thereby isolated.

15. A method as recited in claim 14 wherein said inducing step is accomplished using a laser pumping diode generating light with a wavelength of approximately eight hundred and eight nanometers (808 nm).

16. A method as recited in claim 15 wherein light in said multi-mode laser beam has a wavelength of approximately 1060 nm and wherein each pulse in said multi-mode laser beam has an amplitude and said beating signal frequency is based on variations in said amplitudes of said laser pulses in said multi-mode laser beam.

17. A method as recited in claim 16 wherein said frequency of said beating signal is approximately twenty megahertz (20 MHz) and wherein said pulses in said multi-mode laser beam have a frequency of approximately one hundred and twenty megahertz (120 MHz).

18. A method as recited in claim 17 wherein said lasing medium is Nd:Silicate (3%).

19. A method as recited in claim 18 further comprising the steps of:
   establishing said path for said multi-mode laser beam using a plurality of mirrors, said mirrors having reflective surfaces; and
   layering a chirped coating onto said reflective surfaces of respective said mirrors for providing dispersion control for said pulsed laser beam.

\* \* \* \* \*